Dec. 15, 1959 N. F. WAIT 2,916,828
SWIVEL STYLUS
Filed Nov. 7, 1958
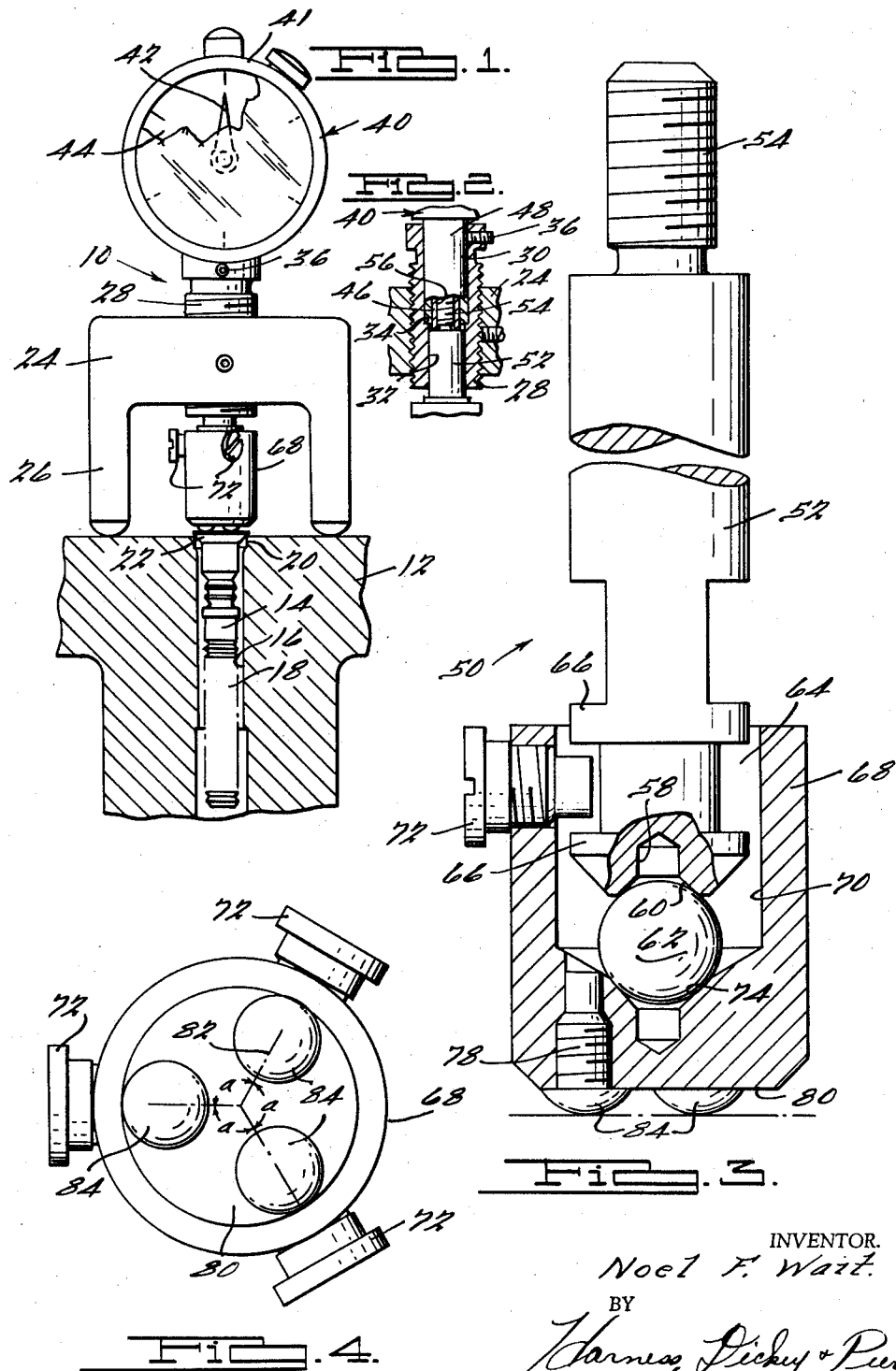
INVENTOR.
Noel F. Wait.
BY
Harness, Dickey & Pierce.
ATTORNEYS.

United States Patent Office 2,916,828
Patented Dec. 15, 1959

2,916,828

SWIVEL STYLUS

Noel F. Wait, Detroit, Mich., assignor to Huck Manufacturing Company, Detroit, Mich., a corporation of Michigan Application November 7, 1958, Serial No. 772,465

4 Claims. (Cl. 33—147)

This invention relates generally to measuring apparatus and more particularly to apparatus for checking the head size of a fastener.

In the manufacture of fasteners of the type utilizing a flat head pin or bolt, the size of the head is very important. For example, many fasteners of this type are used on aircraft surfaces where a protruding head or one which is below the skin surface will create an area of turbulence which may affect the performance of the aircraft. Consequently, an accurate check of the head is required by fastener users to eliminate any offset of the heads with respect to the surrounding surfaces.

Prior checking apparatus utilized a test gauge of the familiar type having a plunger and a rotatable indicator member arranged so that translatory plunger movement causes rotation of the indicator. A stylus attached to the plunger engages a pinhead being tested and indicates on the dial the amount of head protrusion relative to a test pin of the exact desired head size. These styluses have one or two points on the ends thereof which contact the flat terminal end of each head being tested. These contact points are rigidly fixed on the stylus and thus measure only the protrusion of single points on the head surfaces. In the case of a stylus with two contact points at the same level, the one which engages the highest point on the head surface is the only one that affects the indicator movement.

The dial readings are usually in ten-thousandths of an inch and are thus affected by slight surface irregularities on the pinhead. Consequently, since the head surface cannot be perfectly flat or level, different readings are obtained by engaging the stylus contact points with different points on the head surface.

The stylus of this invention has three contact points mounted on a head which is swiveled on the stylus body. As a result, all three contact points will engage the pinhead surface each time a pinhead is checked and the resulting dial reading will be an average of the high and low points on the surface engaged by the contact points. Accordingly, a more accurate picture of the effective protrusion is obtained with the apparatus of this invention.

An object of this invention, therefore, is to provide improved apparatus for checking fastener head size.

Further objects, features and advantages of this invention will become apparent from a consideration of the following description, the appended claims, and the accompanying drawing in which:

Figure 1 is a fragmentary elevational view of the checking apparatus of this invention;

Fig. 2 is a fragmentary longitudinal sectional view of a portion of the apparatus shown in Fig. 1;

Fig. 3 is a vertical sectional view of the stylus in the apparatus of this invention; and Fig. 4 is an end view of the stylus shown in Figs. 1 and 3.

With reference to the drawing, the checking apparatus of this invention, indicated generally at 10, is illustrated in Fig. 1 in assembly relation with a test block 12 and a fastener pin 14 to be checked. The test block 12 is provided with a vertically disposed opening 16 which is of a size to accommodate the shank 18 of the pin 14 when the pinhead 22 is supported on the test block at the upper end of the opening 16. A counterbore 20 at the upper end of the opening 16 is of a size such that a portion of the pinhead 22 projects upwardly out of the counterbore 20.

The checking apparatus 10 includes a tripod gauge support 24 having three legs 26, only two of which are shown, which rest on the test block 12. An externally threaded sleeve 28 adjustably supported in the gauge support 24 has an upper enlarged axial bore 30, a lower axial bore 32 and a horizontal shoulder 34 at the juncture of the bores 30 and 32. At its upper end, the sleeve 28 carries a set screw 36.

A dial indicator 40, of the familiar type having a generally cylindrical body 41 which supports a rotatable indicator member 42 that moves relative to a fixed dial face 44, is provided. A vertically depending stem 48 on the body 41 slidably supports a plunger 46 that is connected in a well-known manner to the indicator member 42, such that reciprocating movement of the plunger 46 causes rotating movement of the indicator member 42. One example of a dial indicator of this type suitable for this purpose is the model C21 dial indicator manufactured by the Federal Products Corporation of Providence, Rhode Island. The dial indicator 40 is mounted on the sleeve 28 by supporting the stem 48 on the shoulder 34 in the sleeve 28 and by advancing the set screw 36 into engagement with the stem 48.

A stylus, indicated generally at 50, is supported on and extends downwardly from the plunger 46. The stylus includes a shank member 52 having a reduced threaded upper end portion 54 which is threaded into an opening 56 in the lower end of the plunger 46. The shank 52 is of a diameter such that it is guidably supported in the bore 32 in the threaded sleeve 28 carried by the tripod support 24 and is of a length such that it extends downwardly below the sleeve 28. The frictional contact between shank 52 and sleeve 28 is insufficient to affect the reading on the indicator 40. At its lower end, the shank member 52 is provided with an upwardly extending opening 58 and is formed at the lower end of the opening with a conical seat 60 for a ball member 62 for a purpose to appear presently. Adjacent to and above the seat 60, the shank 52 is provided with a circumferentially extending groove 64 and is formed with radial flanges 66 on opposite sides of the groove 64.

A hollow head member 68 of substantially cup shape is assembled with the shank 52 by extending the lower end of the shank into a cavity 70 in the head member 68 so that the head member 68 is telescoped on the shank 52 and by then advancing three radially extending set screws 72 carried by the rim portion of the head member 68 into the groove 64. The set screws project into the groove 64 but do not contact the shank in a position of the head member aligned with the shank 52. When the head member it tipped the screws will engage the flanges 66 to limit tipping.

The ball 62 rests on a conical seat 74 formed on the inside surface of the head member 68 at a position aligned with the axis of the head member 68. The ball member 62 is of a size such that it is loosely held between the seats 60 and 74. Three round head, slotless drive screws 78 are threaded into the lower or working end 80 of the head member 68 and are arranged in a triangular configuration. In other words, as best appears in Fig. 4, when lines 82 extending radially of the head member 68 are drawn so that they intersect the axes of the screws 78, the angle A between any two lines 82 is equal to the angle A between any other pair of lines. It is to be understood that more than three screws 78 may be used if desired, since three is only a minimum. In all cases the screws are arranged in approximate equilateral geometrical figures. The screws 78 are advanced into the head member to positions in which only the screw heads 84 project downwardly from the head member so that they function as the fastener head contact points. The head member 68 is thus supported on the shank 52 for swiveling movement relative thereto. In other words, the ball member 62 readily rolls on the seats 60 and 74 to accommodate angular movement of the head member 68 relative to the shank 52. The engagement of the set screws 72 with the flanges 66 limits swiveling movement of the head member 68.

In the use of a checking apparatus 10, a head protrusion master, which is of an exact size corresponding to the nominal dimensions of the fastener to be checked, is first positioned in the opening 16 in the test block 12 so that the head on the master protrudes above the counterbore 20. In place of the master, one or more gauge blocks of a combined thickness equal to the desired head protrusion relative to the size of the counterbore 20 may be placed over the opening 16. The checking apparatus 10 is supported on the block 12 as shown in Fig. 1 with the three screw heads 84 resting on the head of the master. The dial indicator 40 is then manipulated so that the indicator member 42 gives a zero reading. The master is then removed and a fastener to be checked is supported on the test block 12 so that it extends into the opening 16. The test apparatus 10 is again supported on the test block 12 so that the screw heads or contact points 84 engage the top surface of the fastener head 22. By virtue of the swivel support of the head member 68 on the shank 52, engagement of all three contact points 84 with the head 22 is insured. Consequently, the average height of the head 22 relative to the height of the head on the master will be indicated by the dial indicator member 42. If this height is above the height of the master, the indicator member 42 will move in one direction and if it is below that height it will move in the opposite direction. In all cases, an accurate indication of the head protrusion is given on the dial indicator 40.

It will be understood that the specific construction of the improved checking apparatus which is herein disclosed and described is presented for purposes of explanation and illustration and is not intended to indicate limits of the invention, the scope of which is defined by the following claims.

What is claimed is:

1. In apparatus for checking fastener head size wherein the apparatus includes a test block for supporting the portion of the fastener having the head, a gauge support mounted on said test block, a gauge having an indicator member and a reciprocatable plunger operatively associated with the indicator member for actuating the indicator member in response to reciprocation of the plunger, a stylus mounted on said plunger for engagement with the head of a fastener supported on said test block, said stylus comprising a shank member attached to said plunger, a head member swiveled on one end of the shank, and at least three projections on the working end of said head member.

2. In apparatus for checking fastener head size wherein the apparatus includes a test block for supporting the portion of the fastener having the head, a gauge support mounted on said test block, a gauge having an indicator member and a reciprocatable plunger operatively associated with the indicator member for actuating the indicator member in response to reciprocation of the plunger, a stylus mounted on said plunger for engagement with the head of a fastener supported on said test block, said stylus comprising a shank member attached at one end to said plunger for movement therewith, a cup-shaped head member telescoped on the opposite end of the shank, a ball member disposed between and positioned in engagement with said opposite shank end and said head member, coacting projection and groove means on said head member and said shank member for maintaining the head member in a loosely supported position on the shank member, and at least three projections on the working end of said head member.

3. In apparatus for checking fastener head size wherein the apparatus includes a test block for supporting the portion of the fastener having the head, a gauge support mounted on said test block, a gauge having an indicator member and a reciprocatable plunger operatively associated with the indicator member for actuating the indicator member in response to reciprocation of the plunger, a stylus mounted on said plunger for engagement with the head of a fastener supported on said test block, said stylus comprising a shank member attached at one end to said plunger, a head member telescopically supported on the opposite end of the shank, a ball member disposed between and in engagement with said shank and head members to provide for a swivel support of the head member on the shank, and at least three projections on the working end of said head member.

4. In apparatus for checking fastener head size wherein the apparatus includes a test block for supporting the portion of the fastener having the head, a gauge support mounted on said test block, a gauge having an indicator member and a reciprocatable plunger operatively associated with the indicator member for actuating the indicator member in response to reciprocation of the plunger, a stylus mounted on said plunger for engagement with the head of a fastener supported on said test block, said stylus comprising a shank member attached at one of its ends to said plunger and formed intermediate its ends with a circumferentially extending groove, radially extending flanges on opposite sides of said groove, a substantially cup-shaped member telescoped on the opposite end of the shank, means providing for a swivel support of said head member on said shank, set screws carried on a rim portion of said head member and projecting into said groove for engagement with said flanges to limit said swivel movement, and at least three projections on the working end of said head member, extending in a direction parallel to the head member axis.

No references cited.